(12) United States Patent
Urienza (10) Patent No.: US 8,625,251 B2
(45) Date of Patent: Jan. 7, 2014

(54) EMI CAPACITOR DISCHARGER AND THE METHOD THEREOF

(75) Inventor: Joseph Urienza, Milpitas, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 160 days.

(21) Appl. No.: 13/212,115

(22) Filed: Aug. 17, 2011

(65) Prior Publication Data

US 2013/0044403 A1    Feb. 21, 2013

(51) Int. Cl.
*H05F 7/00*  (2006.01)

(52) U.S. Cl.
USPC .......................................... 361/220

(58) Field of Classification Search
USPC .......................................... 361/220
See application file for complete search history.

(56) References Cited

U.S. PATENT DOCUMENTS

| 7,046,529 | B2* | 5/2006 | Chang | 363/44 |
| 8,228,646 | B2* | 7/2012 | Chan et al. | 361/18 |
| 8,305,047 | B2* | 11/2012 | Lin et al. | 320/166 |
| 2010/0309694 | A1* | 12/2010 | Huang et al. | 363/49 |
| 2012/0105016 | A1* | 5/2012 | Moon et al. | 320/166 |
| 2012/0112564 | A1* | 5/2012 | Wu et al. | 307/326 |
| 2012/0134185 | A1* | 5/2012 | Shin et al. | 363/44 |

OTHER PUBLICATIONS

U.S. Appl. No. 12/956,351, filed Nov. 30, 2010.

* cited by examiner

*Primary Examiner* — Scott Bauer
(74) *Attorney, Agent, or Firm* — Perkins Coie LLP (57) ABSTRACT

The present disclosure discloses an EMI capacitor discharger with an active capacitor bleeder which monitors a utility AC source and detects the zero crossing of the utility AC source. When a prolonged period of no zero crossing occurred, the EMI capacitor discharger activates a discharging circuit.

19 Claims, 4 Drawing Sheets

EMI CAPACITOR DISCHARGER AND THE METHOD THEREOF

TECHNICAL FIELD

The present disclosure relates to electronic circuit, more particularly, the present disclosure relates to EMI capacitor dischargers of offline power supplies.

BACKGROUND

Offline power supplies comprise an EMI filter, which typically contains a capacitor coupled at the front end in any power supply unit in order to meet EMI standards. The EMI filter may contain more complicated circuit but typically they contain at least a capacitor. The EMI filter may also contain a passive bleeder resistor to shunt the residual charge when the offline power supply is removed from the utility AC source. But this passive bleeder resistor continually wastes power in the presence of a utility AC source, which reduces efficiency more particularly apparent in low power applications. Also, any unintentional wasted energy particularly due to the bleeder resistor eats up a portion of power consumption budget which makes it harder to become compliant with some energy regulatory standards.

SUMMARY

It is an object of the present disclosure to provide an EMI capacitor discharger which solves the above problems.

In accomplishing the above and other objects, there has been provided, in accordance with an embodiment of the present disclosure, an EMI capacitor discharger, comprising: a first input port and a second input port configured to receive an input AC signal; an EMI capacitor coupled between the first input port and the second input port; a bridge rectifier having a first input terminal, a second input terminal, and an output terminal, wherein the first input terminal is coupled to the first input port, the second input terminal is coupled to the second input port, and wherein the bridge rectifier provides a rectified signal at the output terminal; a zero crossing detector configured to monitor a zero crossing of the input AC signal, and to generate a zero crossing logic flag signal based thereupon; a regulator coupled to the output terminal of the bridge rectifier to receive the rectified signal, and wherein based on the rectified signal, the regulator provides a regulated signal; a timer having a first input terminal, a second input terminal, and an output terminal, wherein the first input terminal is coupled to the regulator to receive the regulated signal, the second input terminal is coupled to the zero crossing detector to receive the zero crossing logic flag signal, and based on the regulated signal and the zero crossing logic flag signal, the timer generates a timeout signal at the output terminal; a logic circuit having a first input terminal, a second input terminal, and an output terminal; wherein the first input terminal is coupled to the output terminal of the timer to receive the timeout signal, the second input terminal is coupled to the output terminal of the zero crossing detector to receive the zero crossing logic flag signal, and based on the timeout signal and the zero crossing logic flag signal, the logic circuit generates a control signal; and a discharge unit having a first terminal, a second terminal, and a control terminal, wherein the first terminal is coupled to the output terminal of the bridge rectifier, the second terminal is coupled to a floating reference ground, and the control terminal is coupled to the output terminal of the logic circuit to receive the control signal, to controllably discharge the EMI capacitor.

In addition, there has been provided, in accordance with an embodiment of the present disclosure, an EMI capacitor discharger, comprising: a first input port and a second input port configured to receive an input AC signal; a ground port; an EMI capacitor coupled between the first input port and the second input port; a bridge rectifier having a first input terminal, a second input terminal, and an output terminal, wherein the first input terminal is coupled to the first input port, the second input terminal is coupled to the second input port, and wherein the bridge rectifier provides a rectified signal at the output terminal; a zero crossing detector having an input terminal coupled to the output terminal of the bridge rectifier to monitor a zero crossing of the input AC signal, and to generate a zero crossing logic flag signal based thereupon; a pull-down resistor coupled between the input terminal of the zero crossing detector and the ground port; a regulator coupled to the output terminal of the bridge rectifier to receive the rectified signal, and wherein based on the rectified signal, the regulator provides a regulated signal; a timer having a first input terminal, a second input terminal, and an output terminal, wherein the first input terminal is coupled to the regulator to receive the regulated signal, the second input terminal is coupled to the zero crossing detector to receive the zero crossing logic flag signal, and based on the regulated signal and the zero crossing logic flag signal, the timer generates a timeout signal at the output terminal; a logic circuit having a first input terminal, a second input terminal, and an output terminal; wherein the first input terminal is coupled to the output terminal of the timer to receive the timeout signal, the second input terminal is coupled to the zero crossing detector to receive the zero crossing logic flag signal, and based on the timeout signal and the zero crossing logic flag signal, the logic circuit generates a control signal; and a discharge unit having a first terminal, a second terminal, and a control terminal, wherein the first terminal is coupled to the output terminal of the bridge rectifier, the second terminal is coupled to the ground port, and the control terminal is coupled to the output terminal of the logic circuit to receive the control signal, to controllably discharge the EMI capacitor.

Furthermore, there has been provided, in accordance with an embodiment of the present disclosure, a method used in an EMI capacitor discharger, comprising: coupling an input AC signal to the EMI capacitor discharger; timing a predetermined period by a timer; monitoring the input AC signal to detect whether the input AC signal crosses zero; and if a zero crossing is detected within the predetermined period, resetting the timer to restart the timing of the predetermined period; if no zero crossing is detected during the predetermined period, discharging an EMI capacitor when the timer completes timing the predetermined period.

BRIEF DESCRIPTION OF THE DRAWINGS

The use of the same reference label in different drawings indicates the same of like components.

DETAILED DESCRIPTION

Embodiments of circuits for EMI capacitor discharger are described in detail herein. In the following description, some specific details, such as example circuits for these circuit components, are included to provide a thorough understanding of embodiments of the disclosure. One skilled in relevant art will recognize, however, that the disclosure can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

The present disclosure relates to circuits and methods of an EMI capacitor discharger. A zero crossing detector monitors the utility AC line voltage, and detects for line voltage zero crossings. When a period of no zero crossing has occurred, the EMI capacitor discharger circuit gets activated.

Figure 1:
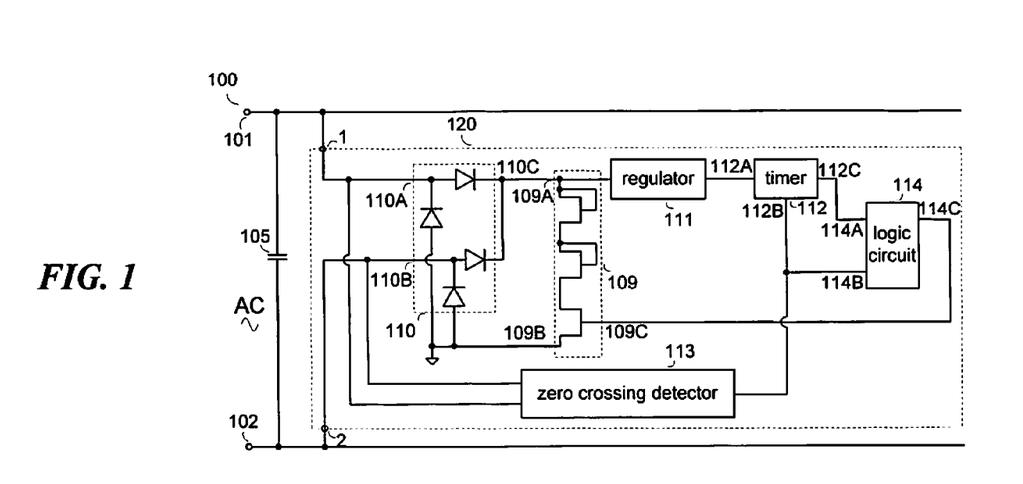
FIG. 1 illustrates a schematic circuit of an EMI capacitor discharger 100 in accordance with an embodiment of the present disclosure.

FIG. 1 illustrates a schematic circuit of an EMI capacitor discharger 100 in accordance with an embodiment of the present disclosure. In the example of FIG. 1, the EMI capacitor discharger 100 comprises a 2-terminal EMI capacitor discharger. In the example of FIG. 1, the EMI capacitor discharger 100 comprises a first input port 101 and a second input port 102 configured to receive an input AC signal; an EMI capacitor 105 coupled between the first input port 101 and the second input port 102; a bridge rectifier 110 having a first input terminal 110A, a second input terminal 110B, and an output terminal 110C, wherein the first input terminal 110A is coupled to the first input port 101, the second input terminal 110B is coupled to the second input port 102, and wherein the bridge rectifier 110 provides a rectified signal at the output terminal 110C; a zero crossing detector 113 configured to monitor a zero crossing of the input AC signal, and to generate a zero crossing logic flag signal based thereupon; a regulator 111 coupled to the output terminal 110C of the bridge rectifier 110 to receive the rectified signal, and wherein based on the rectified signal, the regulator 111 provides a regulated signal; a timer 112 having a first input terminal 112A, a second input terminal 112B, and an output terminal 112C, wherein the first input terminal 112A is coupled to the regulator 111 to receive the regulated signal, the second input terminal 112B is coupled to the zero crossing detector 113 to receive the zero crossing logic flag signal, and based on the regulated signal and the zero crossing logic flag signal, the timer 112 generates a timeout signal at the output terminal; a logic circuit 114 having a first input terminal 114A, a second input terminal 114B, and an output terminal 114C, wherein the first input terminal 114A is coupled to the output terminal 112C of the timer 112 to receive the timeout signal, the second input terminal 114B is coupled to the zero crossing detector 113 to receive the zero crossing logic flag signal, and based on the timeout signal and the zero crossing logic flag signal, the logic circuit 114 generates a control signal at the output terminal 114C; and a discharge unit 109 having a first terminal 109A, a second terminal 109B, and a control terminal 109C, wherein the first terminal 109A is coupled to the output terminal 110C of the bridge rectifier 110, the second terminal 109B is coupled to a floating reference ground, and the control terminal 109C is coupled to the output terminal 114C of the logic circuit 114 to receive the control signal, to controllably discharge the EMI capacitor.

In one embodiment, the logic circuit 114 may comprise a latch circuit having a set terminal, a reset terminal, and a Q output terminal. In one embodiment, the set terminal acts as the first input terminal, the reset terminal acts as the second input terminal.

In one embodiment, the discharge unit 109 comprises a first switched transistor and a plurality of normally-ON transistors coupled in series between the first terminal and the second terminal of the discharge unit, wherein the first switched transistor has a control terminal coupled to the control terminal of the discharge unit, so that when a prolonged period of no zero crossing of the input AC signal occurs, the third switched transistor controlled to be on to discharge the EMI capacitor.

In one embodiment, the number of the normally-ON transistors is determined by the voltage headroom which is used to maintain power supply to other circuits.

In one embodiment, the bridge rectifier 110 comprises the well-known 4-diode bridge rectifier.

In one embodiment, the regulator comprises a bypass capacitor.

During the operation of the EMI capacitor discharger 100, in one hand, the input AC signal is delivered to the rectifier 110 to get rectified. The regulator 111 receives the rectified signal, and generates the regulated signal, which powers the timer 112 and other circuits. The regulator has a small internal bypass capacitor enough to support the regulation during near zero crossing of the rectified signal (or the valley of rectified signal). Bias requirement of internal circuits are minimized to reduce the internal bypass capacitor size. The timer 112 when powered will either keeps ramping up from zero to supply voltage or gets reset or clamps down to zero by a resetting switch (a transistor). On the other hand, the input AC signal is also delivered to the zero crossing detector 113 to get zero crossing monitored. If the input AC signal crosses zero, the zero crossing detector 113 generates a pulse logic high zero crossing logic flag signal, which resets the logic circuit 114 and the timer 112, so that the control signal stays low and the timer 112 restarts to time from zero again. If a prolonged period of no zero crossing occurs, e.g., the input AC signal is unplugged from offline power supply which contains this EMI capacitor discharger 100, the timer 112 generates a logical high timeout signal to trigger the logic circuit 114. As a result, the logic circuit 114 generates a logic high control signal to the discharge unit 109 to control the discharge unit 109 to be on. Accordingly, the EMI capacitor 105 starts to be discharged through the discharge unit 109. The discharge process will stop when the voltage across the EMI capacitor 105 is less than a predetermined value, e.g. 10V, or the EMI capacitor discharger 100 is re-plugged to the utility AC source.

In one embodiment, most of the components of the EMI capacitor discharger 100 may be integrated in a two-terminal smart bleeder 120, as the dashed frame shown in FIG. 1.

Figure 2:
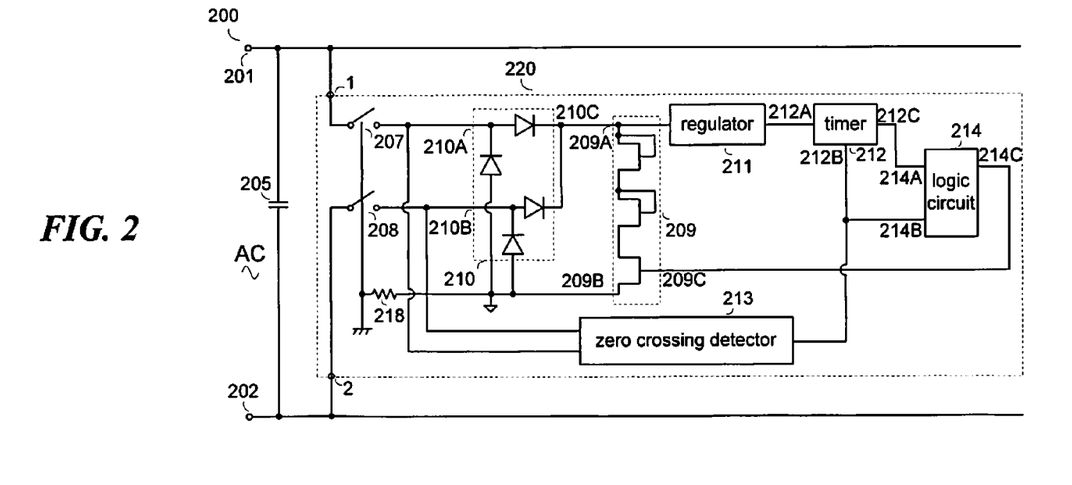
FIG. 2 illustrates a schematic circuit of an EMI capacitor discharger 200 in accordance with an embodiment of the present disclosure.

FIG. 2 schematically illustrates an EMI capacitor discharger 200 in accordance with an embodiment of the present disclosure. In the example of FIG. 2, the EMI capacitor discharger 200 comprises the components in the EMI capacitor discharger 100 of FIG. 1, and it further comprises a first depletion type pass transistor 207 coupled between the first input port 201 and the first input terminal 210A of the bridge rectifier 210; and a second depletion type pass transistor 208 coupled between the second input port 202 and the second input terminal 210B of the bridge rectifier 210.

In one embodiment, the first depletion type pass transistor 207 comprises a first JFET device, and the second depletion type pass transistor comprises a second JFET device, and wherein the first JFET device and the second JFET device both having a substrate coupled to the floating reference ground, respectively. However, one skilled in the art should realize that the first depletion type pass transistor and the second depletion type pass transistor may comprises other kind of transistors, such as depletion MOSFETs.

In one embodiment, both the first depletion type pass transistor 207 and the second depletion type pass transistor 208 may have a substrate connected to the floating reference ground via a ballast resistor 218, respectively. The ballast resistor 218 minimizes substrate injection when the body and the drain, which forms as a junction parasitic diode, of either JFET get forward biased. However, one skilled in the art should realize that other techniques may be adopted to minimize the substrate injection, e.g., utilizing Schottky diodes in bridge rectifier and then limiting the operating current, placing the two JFETs as farthest as possible in the die.

Figure 3:
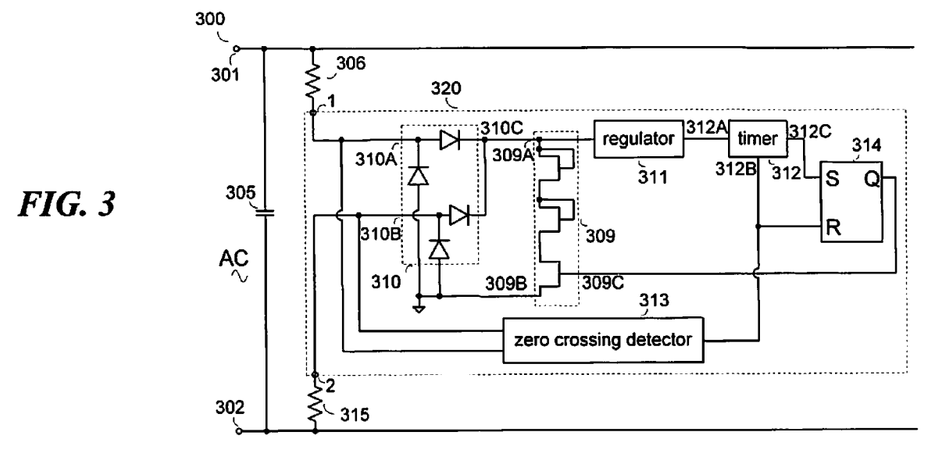
FIG. 3 illustrates a schematic circuit of an EMI capacitor discharger 300 in accordance with an embodiment of the present disclosure.

In one embodiment, the EMI capacitor discharger may further comprises bleeder resistors. FIG. 3 schematically illustrates an EMI capacitor discharger 300 in accordance with an embodiment of the present disclosure. In the example of FIG. 3, the EMI capacitor discharger 300 comprises the components in the EMI capacitor discharger 100 of FIG. 1, and it further comprises a first bleeder resistor 306 coupled between the first input port 301 and the first input terminal 310A of the bridge rectifier 310; and a second bleeder resistor 315 coupled between the second input port 302 and the second input terminal 310A of the bridge rectifier 310.

In one embodiment, the EMI capacitor discharger may comprise one bleeder resistor instead of two bleeder resistors, which will not be illustrated for ease of illustration.

In one embodiment, a surge resistor may be needed to absorb the surge current, e.g. the spike current. The surge resistor may be coupled between the input port and the input terminal of the bridge rectifier.

Figure 4:
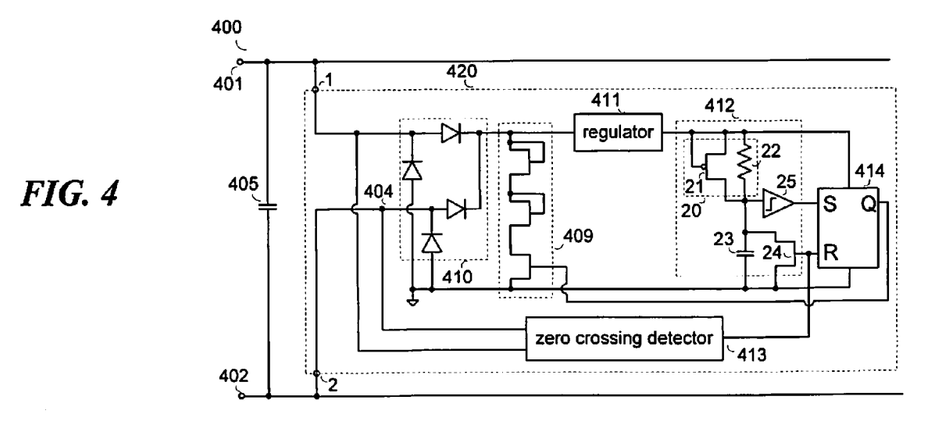
FIG. 4 illustrates a schematic circuit of an EMI capacitor discharger 400 with a schematic circuit of the timer 412 in accordance with an embodiment of the present disclosure.

FIG. 4 schematically illustrates an EMI capacitor discharger 400 with a schematic circuit of the timer 412 in accordance with an embodiment of the present disclosure. In the example of FIG. 4, the timer 412 comprises a current source 20 coupled to the regulator 411 to receive the regulated signal as its power supply, and provides a charge current signal based thereupon; a capacitor 23 having a first terminal and a second terminal, wherein the first terminal is coupled to the current source 20 to receive the charge current signal; a reset switch 24 coupled in parallel with the capacitor 23; and a Schmitt trigger 25 coupled to the first terminal of the capacitor 23. The reset switch 24 further has a control terminal coupled to the zero crossing detector 313 to receive the zero crossing logic flag signal. In one embodiment, the current source 20 is configured by a PMOS 21 and a resistor 22 connected as shown. In one embodiment, the main purpose of the PMOS 21 is to balance the leakage current due to the reset switch 24.

In one embodiment, the current source 20 may be configured by a depletion transistor, and a PMOS current source mirror, or just a passive resistor.

During the operation of the EMI capacitor discharger, the capacitor 23 is charged by the charge current signal, so that the voltage across the capacitor 23 increases. When the input AC signal crosses zero, the zero crossing detector 413 outputs a logical high zero crossing logic flag signal, which turns on the reset switch 24. Accordingly, the voltage across the capacitor 23 is reset to zero. If the input AC signal is unplugged to the EMI capacitor discharger 400 for a prolonged period, the voltage across the capacitor 23 may increase to be higher than a preset voltage value. As a result, the Schmitt trigger 25 generates a logical high timeout signal to set the logic circuit 414, causing the control signal to turn to high, which turns the discharge unit 309. As previously discussed, the EMI capacitor 405 starts to be discharged.

Figure 5:
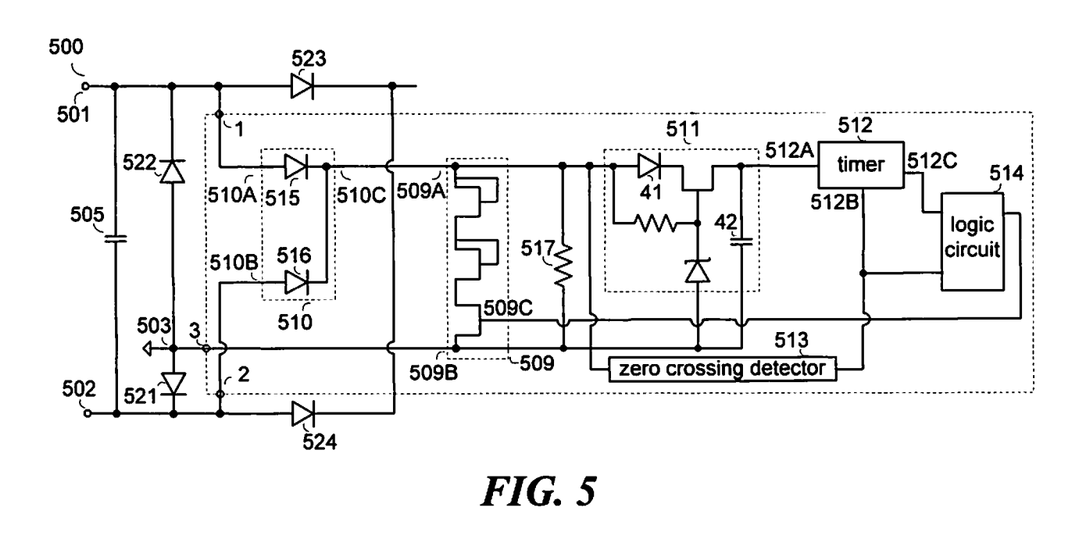
FIG. 5 schematically illustrates an EMI capacitor discharger 500 with a schematic circuit of a regulator 511 in accordance with an embodiment of the present disclosure.

FIG. 5 schematically illustrates an EMI capacitor discharger 500 with a schematic circuit of a regulator 511 in accordance with an embodiment of the present disclosure. In the example of FIG. 5, the EMI capacitor discharger 500 comprises a first input port 501 ($1^{st}$ terminal) and a second input port 502 ($2^{nd}$ terminal) configured to receive an input AC signal; a ground port 503 ($3^{rd}$ terminal); an EMI capacitor 505 coupled between the first input port 501 and the second input port 502; a bridge rectifier 510 having a first input terminal 510A, a second input terminal 510B, and an output terminal 510C, wherein the first input terminal 510A is coupled to the first input port 501, the second input terminal 510B is coupled to the second input port 502, and wherein the bridge rectifier 510 provides a rectified signal at the output terminal 510C; a zero crossing detector 513 having an input terminal 513A coupled to the output terminal 510C of the bridge rectifier 510 to monitor a zero crossing of the input AC signal, and to generate a zero crossing logic flag signal based thereupon; a pull-down resistor 517 coupled between the input terminal 513A of the zero crossing detector and the ground port; a regulator 511 coupled to the output terminal 510C of the bridge rectifier 510 to receive the rectified signal, and wherein based on the rectified signal, the regulator 511 provides a regulated signal; a timer 512 having a first input terminal 512A, a second input terminal 512B, and an output terminal 512C, wherein the first input terminal 512A is coupled to the regulator 511 to receive the regulated signal, the second input terminal 512B is coupled to the zero crossing detector 513 to receive the zero crossing logic flag signal, and based on the regulated signal and the zero crossing logic flag signal, the timer 512 generates a timeout signal at the output terminal; a logic circuit 514 having a first input terminal 514A, a second input terminal 514B, and an output terminal 514C; wherein the first input terminal 514A is coupled to the output terminal 512C of the timer 512 to receive the timeout signal, the second input terminal 514B is coupled to the zero crossing detector 513 to receive the zero crossing logic flag signal, and based on the timeout signal and the zero crossing logic flag signal, the logic circuit 514 generates a control signal; and a discharge unit 509 having a first terminal 509A, a second terminal 509B, and a control terminal 509C, wherein the first terminal 509A is coupled to the output terminal 510C of the bridge rectifier, the second terminal 512B is coupled to the ground port 503, and the control terminal 509C is coupled to the output terminal 514C of the logic circuit 514 to receive the control signal, to controllably discharge the EMI capacitor.

In the example of FIG. 5, the pull-down resistor 517 is used to bring down the rectified signal to zero when the input AC signal is zero crossing.

In the example of FIG. 5, the regulator 511 comprises a blocking diode 41 and a bypass capacitor 42 connected as shown, wherein the bypass capacitor 42 is used to support the regulation during near zero crossing of the rectified signal.

In one embodiment, the bridge rectifier 510 comprises a first diode 515 coupled to the first input port 501; and a second diode 516 coupled to the second input port 502.

In the example of FIG. 5, the EMI capacitor discharger 500 further comprises a second bridge rectifier which includes a first rectifying diode 521, a second rectifying diode 522, a third rectifying diode 523, and a fourth rectifying diode 524; wherein each rectifying diode includes an anode and a cathode; and further wherein the anodes of the first rectifying diode 521 and the second rectifying diode 522 are coupled together to the ground port, the cathode of the second rectifying diode 522 and the anode of the third rectifying diode 523 are coupled together to the first input port 501, the cathode of the first rectifying diode 521 and the anode of the fourth rectifying diode 524 are coupled together to the second input port 502, and the cathodes of the third rectifying diode 523 and the fourth diode 524 are coupled together.

In one embodiment, the EMI capacitor discharger 500 further comprises a first depletion type pass transistor coupled between the first input port and the first input terminal of the bridge rectifier; and a second depletion type pass transistor coupled between the second input port and the second input terminal of the bridge rectifier.

Since the internal reference ground, i.e., the ground port is coupled to the external bridge rectifier negative or GND terminal, there is no junction diode that is getting forward biased.

In one embodiment, the EMI capacitor discharger 500 may further comprise one or two bleeder resistors to adjust the discharge time of the EMI capacitor.

In one embodiment, the EMI capacitor discharger 400 may further comprise one or two surge resistors to absorb the surge current.

The operation of the EMI capacitor discharger 500 is similar to that of the EMI capacitor discharger 100 as discussed hereinbefore.

Figure 6:
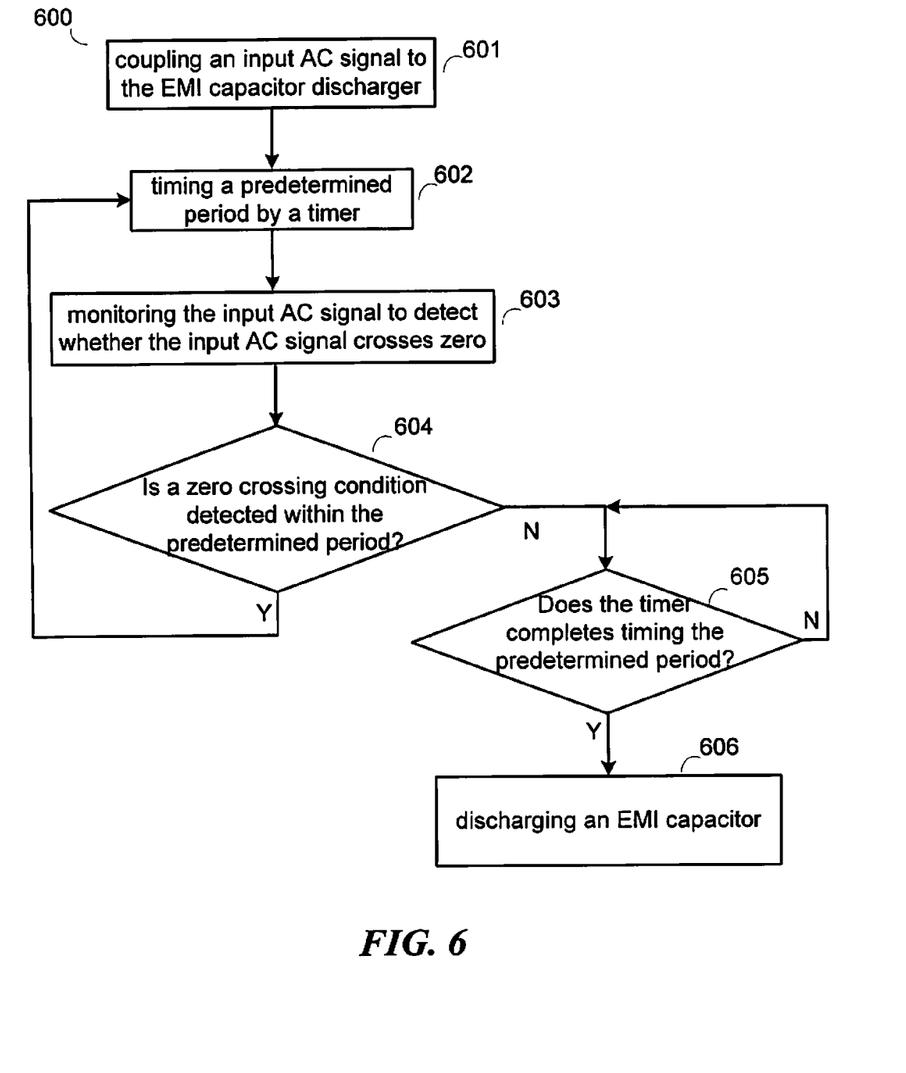
FIG. 6 shows a schematic flowchart 600 of a method used in an EMI capacitor discharger in accordance with an embodiment of the present disclosure.

FIG. 6 shows a schematic flowchart 600 of a method used in an EMI capacitor discharger in accordance with an embodiment of the present disclosure. The method comprises following steps:

Step 601, coupling an input AC signal to the EMI capacitor discharger.

Step 602, timing a predetermined period by a timer. In one embodiment, the timer comprises a capacitor, and a current source, a reset switch, and a Schmitt trigger; and the timing of the predetermined period comprises: charging a capacitor by a current source to increase a voltage across the capacitor; comparing the voltage across the capacitor with a preset voltage value; generating a timeout signal by the Schmitt trigger if the voltage across the capacitor is higher than the preset voltage value to indicate the timing of the predetermined period is completed; and resetting the voltage across the capacitor to be zero by the reset switch if a zero crossing is detected.

Step 603, monitoring the input AC signal to detect whether the input AC signal crosses zero.

Step 604, judging if a zero crossing condition is detected; if the zero crossing is detected within the predetermined period, resetting the timer and going back to step 602 to restart the timing of the predetermined period; if no zero crossing is detected during the predetermined period, go to step 605.

Step 605, judging if the timer completes timing of the predetermined period, if the timer completes timing the predetermined period, go to step 606.

Step 606, discharging an EMI capacitor.

In one embodiment, the discharging of the EMI capacitor is stopped when a voltage across the EMI capacitor becomes lower than a predetermined value, e.g., 10V, or the zero crossing of the input AC signal is detected.

This written description uses examples to disclose the disclosure, including the best mode, and also to enable a person skilled in the art to make and use the disclosure. The patentable scope of the disclosure may include other examples that occur to those skilled in the art.

I claim:

1. An EMI capacitor discharger, comprising:
   a first input port and a second input port configured to receive an input AC signal;
   an EMI capacitor coupled between the first input port and the second input port;
   a bridge rectifier having a first input terminal, a second input terminal, and an output terminal, wherein the first input terminal is coupled to the first input port, the second input terminal is coupled to the second input port, and wherein the bridge rectifier provides a rectified signal at the output terminal;
   a zero crossing detector configured to monitor a zero crossing of the input AC signal, and to generate a zero crossing logic flag signal based thereupon;
   a regulator coupled to the output terminal of the bridge rectifier to receive the rectified signal, and wherein based on the rectified signal, the regulator provides a regulated signal;
   a timer having a first input terminal, a second input terminal, and an output terminal, wherein the first input terminal is coupled to the regulator to receive the regulated signal, the second input terminal is coupled to the zero crossing detector to receive the zero crossing logic flag signal, and based on the regulated signal and the zero crossing logic flag signal, the timer generates a timeout signal at the output terminal;
   a logic circuit having a first input terminal, a second input terminal, and an output terminal; wherein the first input terminal is coupled to the output terminal of the timer to receive the timeout signal, the second input terminal is coupled to the output terminal of the zero crossing detector to receive the zero crossing logic flag signal, and based on the timeout signal and the zero crossing logic flag signal, the logic circuit generates a control signal; and
   a discharge unit having a first terminal, a second terminal, and a control terminal, wherein the first terminal is coupled to the output terminal of the bridge rectifier, the second terminal is coupled to a floating reference ground, and the control terminal is coupled to the output terminal of the logic circuit to receive the control signal, to controllably discharge the EMI capacitor.

2. The EMI capacitor discharger of claim 1, further comprising:
   a first depletion type pass transistor coupled between the first input port and the first input terminal of the bridge rectifier; and
   a second depletion type pass transistor coupled between the second input port and the second input terminal of the bridge rectifier.

3. The EMI capacitor discharger of claim 2, wherein the first depletion type pass transistor comprises a first JFET device, and the second depletion type pass transistor comprises a second JFET device, and wherein the first JFET device and the second JFET device both having a substrate coupled to the floating reference ground, respectively.

4. The EMI capacitor discharger of claim 2, wherein the first depletion type pass transistor and the second depletion type has a substrate connected to the floating reference ground via a ballast resistor, respectively.

5. The EMI capacitor discharger of claim 1, further comprising a bleeder resistor coupled between the first input port and the first input terminal of the bridge rectifier.

6. The EMI capacitor discharger of claim 1, further comprises a surge resistor coupled between the first input port and the first input terminal of the bridge rectifier.

7. The EMI capacitor discharger of claim 1, wherein the timer comprises:
   a current source having an input terminal and an output terminal, wherein the input terminal is coupled to the regulator to receive the regulated signal as its power supply, and the output terminal provides a charge current signal;
   a capacitor having a first terminal and a second terminal, wherein the first terminal is coupled to the current source to receive the charge current signal;
   a reset switch coupled in parallel with the capacitor; and
   a Schmitt trigger coupled to the first terminal of the capacitor; wherein the reset switch further has a control terminal coupled to the zero crossing detector to receive the zero crossing detected signal.

8. The EMI capacitor discharger of claim 1, wherein the regulator comprises a bypass capacitor.

9. The EMI capacitor discharger of claim 1, wherein the discharge unit comprises a first switched transistor and a plurality of normally-ON transistors coupled in series between the first terminal and the second terminal of the discharge unit; wherein
   the first switched transistor has a control terminal coupled to the control terminal of the discharge unit.

10. The EMI capacitor discharger of claim 1, wherein if the zero crossing flag signal occurs, the timer is reset and will not generate a timeout signal with logical high level.

11. An EMI capacitor discharger, comprising:
    a first input port and a second input port configured to receive an input AC signal;
    a ground port;
    an EMI capacitor coupled between the first input port and the second input port;
    a bridge rectifier having a first input terminal, a second input terminal, and an output terminal, wherein the first input terminal is coupled to the first input port, the second input terminal is coupled to the second input port, and wherein the bridge rectifier provides a rectified signal at the output terminal;
    a zero crossing detector having an input terminal coupled to the output terminal of the bridge rectifier to monitor a zero crossing of the input AC signal, and to generate a zero crossing logic flag signal based thereupon;
    a pull-down resistor coupled between the input terminal of the zero crossing detector and the ground port;
    a regulator coupled to the output terminal of the bridge rectifier to receive the rectified signal, and wherein based on the rectified signal, the regulator provides a regulated signal;
    a timer having a first input terminal, a second input terminal, and an output terminal, wherein the first input terminal is coupled to the regulator to receive the regulated signal, the second input terminal is coupled to the zero crossing detector to receive the zero crossing logic flag signal, and based on the regulated signal and the zero crossing logic flag signal, the timer generates a timeout signal at the output terminal;
    a logic circuit having a first input terminal, a second input terminal, and an output terminal; wherein the first input terminal is coupled to the output terminal of the timer to receive the timeout signal, the second input terminal is coupled to the zero crossing detector to receive the zero crossing logic flag signal, and based on the timeout signal and the zero crossing logic flag signal, the logic circuit generates a control signal; and
    a discharge unit having a first terminal, a second terminal, and a control terminal, wherein the first terminal is coupled to the output terminal of the bridge rectifier, the second terminal is coupled to the ground port, and the control terminal is coupled to the output terminal of the logic circuit to receive the control signal, to controllably discharge the EMI capacitor.

12. The EMI capacitor discharger of claim 11, wherein the bridge rectifier comprises:
    a first diode coupled to the first input port; and
    a second diode coupled to the second input port.

13. The EMI capacitor discharger of claim 11, further comprising:
    a first depletion type pass transistor coupled between the first input port and the first input terminal of the bridge rectifier; and
    a second depletion type pass transistor coupled between the second input port and the second input terminal of the bridge rectifier.

14. The EMI capacitor discharger of claim 11, wherein the timer comprises:
    a current source having an input terminal and an output terminal, wherein the input terminal is coupled to the regulator to receive the regulated signal as its power supply, and the output terminal provides a charge current signal;
    a capacitor having a first terminal and a second terminal, wherein the first terminal is coupled to the current source to receive the charge current signal;
    a reset switch coupled in parallel with the capacitor; and
    a Schmitt trigger coupled to the first terminal of the capacitor; wherein the reset switch further has a control terminal coupled to the zero crossing detector to receive the zero crossing detected signal.

15. The EMI capacitor discharger of claim 11, wherein the discharger unit comprises a first switched transistor and a plurality of normally-ON transistors coupled in series between the first terminal and the second terminal of the discharge unit; wherein
    the first switched transistor has a control terminal coupled to the control terminal of the discharge unit.

16. The EMI capacitor discharger of claim 11, further comprising a second bridge rectifier including a first rectifying diode, a second rectifying diode, a third rectifying diode, and a fourth rectifying diode; wherein each rectifying diode includes an anode and a cathode; and further wherein
    the anodes of the first rectifying diode and the second rectifying diode are coupled together to the ground port, the cathode of the second rectifying diode and the anode of the third rectifying diode are coupled together to the first input port, the cathode of the first rectifying diode and the anode of the fourth rectifying diode are coupled together to the second input port, and the cathodes of the third rectifying diode and the fourth diode are coupled together.

17. The EMI capacitor discharger of claim 11, wherein if the zero crossing flag signal occurs, the timer is reset and will not generate a timeout signal with logical high level.

18. A method used in an EMI capacitor discharger, comprising:
    coupling an input AC signal to the EMI capacitor discharger;
    timing a predetermined period by a timer;

monitoring the input AC signal to detect whether the input AC signal crosses zero; and if a zero crossing is detected within the predetermined period, resetting the timer to restart the timing of the predetermined period;

if no zero crossing is detected during the predetermined period, discharging an EMI capacitor when the timer completes timing the predetermined period; wherein the timer comprises a capacitor, and a current source, a reset switch, and a Schmitt trigger; and wherein the timing of the predetermined period comprises:

charging a capacitor by a current source to increase a voltage across the capacitor;

comparing the voltage across the capacitor with a preset voltage value;

generating a timeout signal by the Schmitt trigger if the voltage across the capacitor is higher than the preset voltage value to indicate the timing of the predetermined period is completed; and resetting the voltage across the capacitor to be zero by the reset switch if a zero crossing is detected.

19. The method of claim 18, wherein the discharging of the EMI capacitor is stopped when a voltage across the EMI capacitor becomes lower than a predetermined value or the zero crossing of the input AC signal is detected.

* * * * *